Jan. 12, 1926. 1,569,152
T. H. SWARTZLANDER
GLASS TANK CONSTRUCTION
Filed March 25, 1922 4 Sheets-Sheet 2
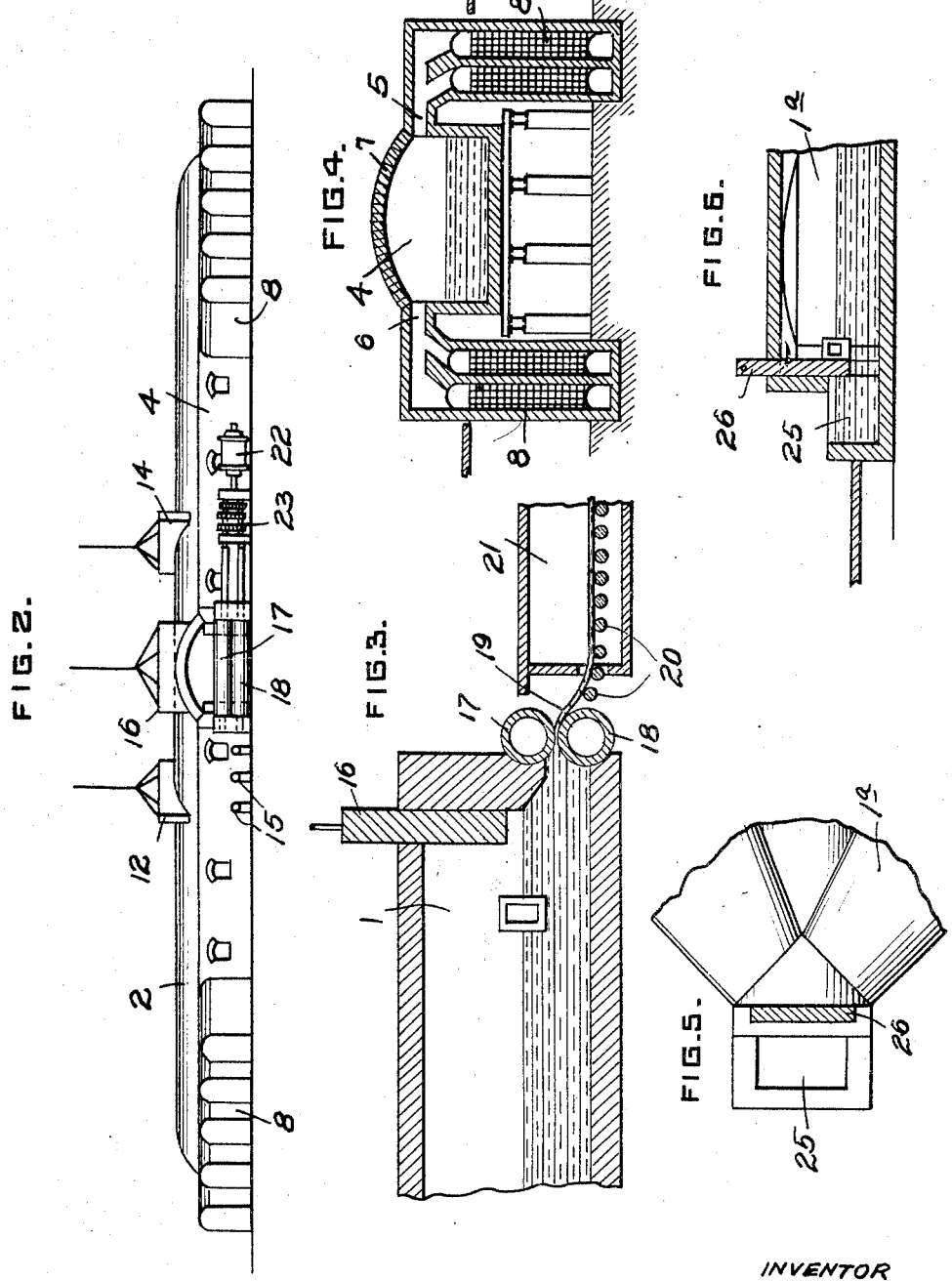
INVENTOR
T. H. Swartzlander
by
James C. Brasley
Atty

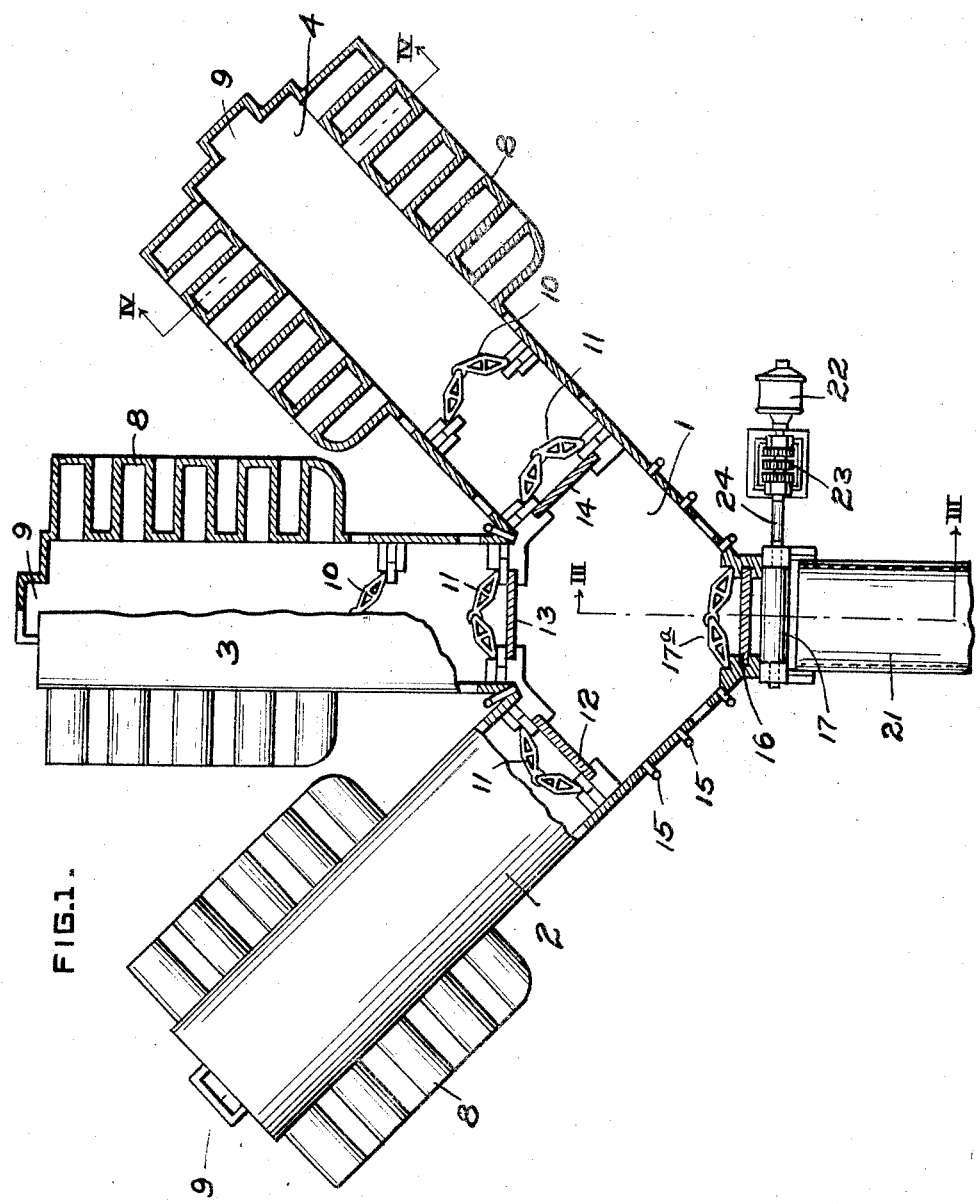

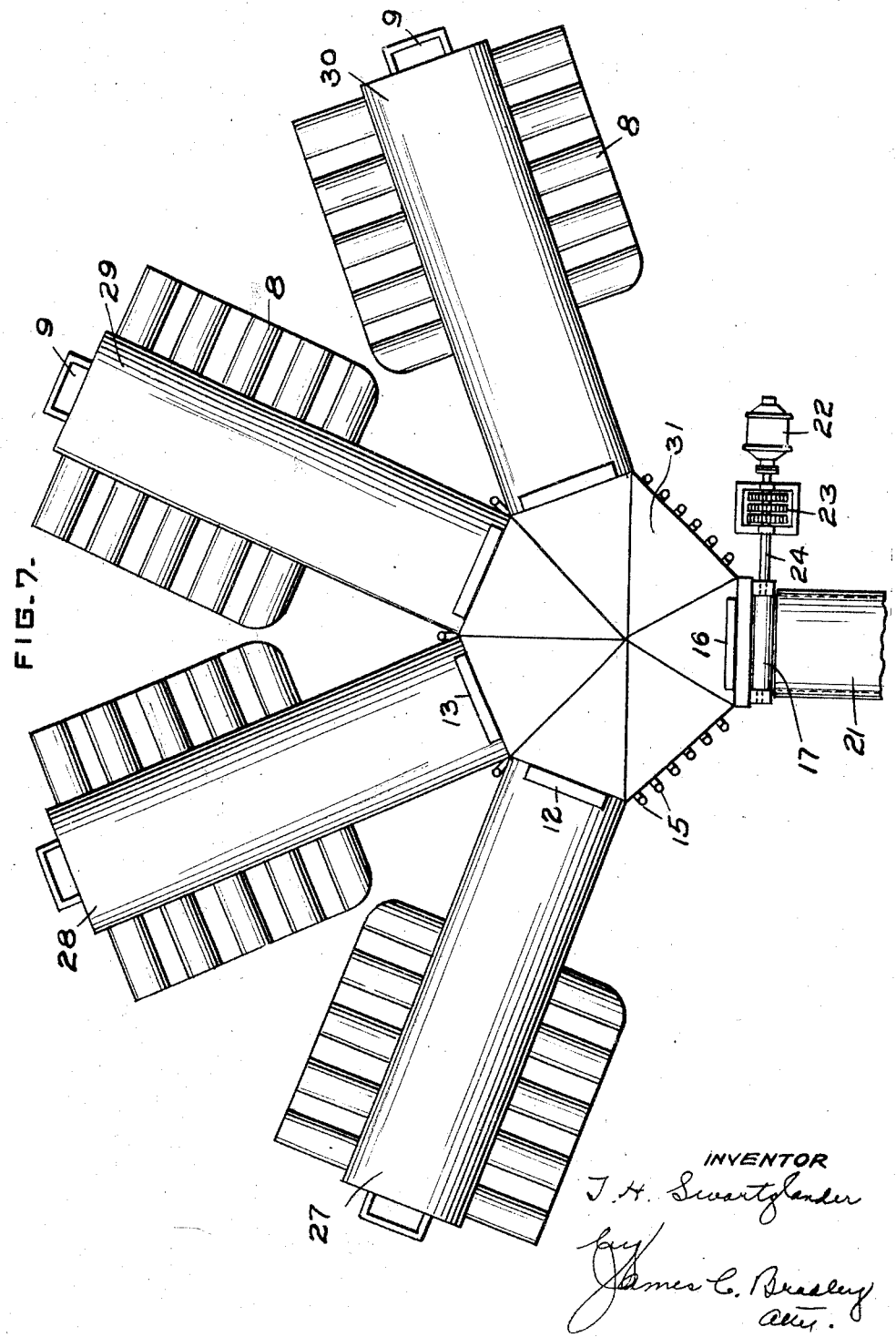

Jan. 12, 1926.  
T. H. SWARTZLANDER  
GLASS TANK CONSTRUCTION  
Filed March 25, 1922  
1,569,152  
4 Sheets-Sheet 4
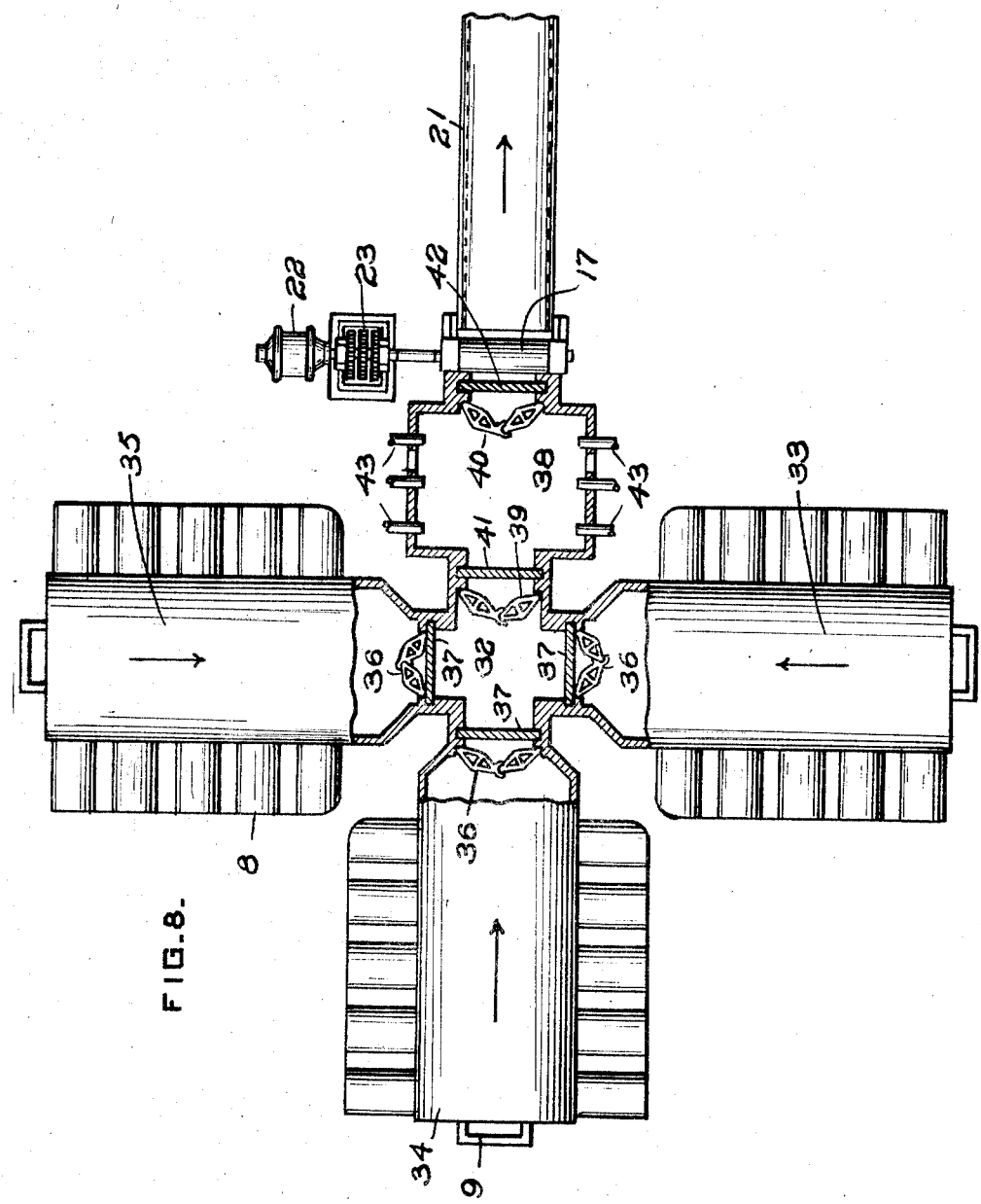
INVENTOR  
T.H. Swartzlander  
by  
James C. Bradley  
Atty Patented Jan. 12, 1926.

1,569,152

UNITED STATES PATENT OFFICE.

THOMAS H. SWARTZLANDER, OF ASPINWALL, PENNSYLVANIA, ASSIGNOR TO PITTSBURGH PLATE GLASS COMPANY, A CORPORATION OF PENNSYLVANIA.

GLASS TANK CONSTRUCTION.

Application filed March 25, 1922. Serial No. 546,866.

*To all whom it may concern:*

Be it known that I, THOMAS H. SWARTZLANDER, a citizen of the United States, and a resident of Aspinwall, in the county of Allegheny and State of Pennsylvania, have made a new and useful invention in Improvements in Glass Tank Construction, of which the following is a specification.

The invention relates to tank construction and has for its principal object the provision of an improved form of tank adapted to melt and refine (or "fine" as the step of refining is ordinarily termed in the art) a large volume of glass economically and produce a product of high quality. The invention is designed primarily for use in a system in which sheet glass is rolled or drawn continuously from a tank to produce window, plate or wire glass, but might be used advantageously in other relations where a tank of unusually large capacity is required. The apparatus preferably used for rolling out the sheet is illustrated herein very simply and diagrammatically, as such apparatus as to matters of detail constitutes no part of my invention, reference being made to the application of Frederick Gelstharp, Serial No. 531,053, filed January 23, 1922, for more detailed illustration and description of rolling apparatus of this general type.

The ordinary continuous regenerator type of tank furnace, such as is used in the manufacture of window glass, is satisfactory for furnishing quantities of glass for sheet purposes where the amount of glass required is not too great. When the size of tanks of this kind is increased beyond a certain point, however, difficulty is experienced in properly reducing the glass. It is not feasible to increase the length of the tank beyond a certain point, while still maintaining its width, as the furnace becomes uneconomical because of the increased ratio of radiating surface as compared with the volume of glass. It is also impractical to increase the width of the tank beyond a certain point to correspond with an increased length since the regenerators cannot maintain the necessary heat across a tank of too great width, the result being that the glass passing along through the central portion of the tank to the withdrawal point will not be properly melted and fined. The object of the present invention is to retain all the advantages of the present regenerator tank of standard size and proportions, while at the same time increasing to a large extent the quantity of properly melted and fined glass produced, this being particularly necessary where the sheet glass is to be produced in a continuous ribbon of considerable width, as such a method calls for a supply of glass far beyond the capacity of the ordinary tank, which as above pointed out, it is not practical to increase in size beyond certain more or less well defined limits. Certain embodiments of the invention are illustrated in the accompanying drawings wherein:

Figure 1 is a partial plan view and partial horizontal section of one form of construction. Fig. 2 is a front elevation of the construction of Fig. 1. Figs. 3 and 4 are sections respectively on lines III—III and IV—IV of Fig. 1. Figs. 5 and 6 are a plan view of and a vertical section through the fining chamber of a modification, such as might be used where the glass is to be removed from the fining chamber by ladling. Fig. 7 is a plan view of a modified form of tank arrangement. And Fig. 8 is a horizontal section through another modification constituting the preferred embodiment of the invention.

Referring to the construction of Fig. 1, 1 is a fining tank and 2, 3, and 4 are melting tanks radiating from the fining tank and opening into such tank at their forward ends. The melting tanks are of the ordinary regenerative type, as will be understood by reference to Fig. 4 in connection with Fig. 1. Ports 5 and 6 lead into the tank beneath the arch 7 (Fig. 4) and a mixture of gas and air from the regenerators 8—8 passes into the tank and is burned intermediate the arch and the surface of the body of glass in the tank. The mixture of air and gas is reversed in direction at intervals in a manner well known in connection with the use of regenerators with glass furnaces, there being nothing novel in the application of these regenerators to the melting tanks disclosed in the present application. Batch is supplied to the feeding openings 9 at the rear end of each of the melting tanks, and the body of glass in the tanks is skimmed as it moves forward to the fining chamber by means of suitable skimmers 10 and 11 in the form of floats arranged intermediate the regenerators and the forward ends of the tanks. Intermediate the forward ends of the melting tanks and the fining tank are the grates 12, 13 and 14, which are mounted for movement in a vertical direction, and which serve to shut off the supply of glass between the melting tanks and the fining tank. This may become necessary or desirable under a number of different conditions. For instance, it may be desirable to discontinue the operation of one of the melting tanks for either hot or cold repairs and in that case, the gate of the tank to be repaired may be closed while the operation of the other two tanks may be continued.

The body of glass in the fining tank 1 may be heated in various ways, burners 15 being shown for this purpose arranged along the side of the chamber above the surface of the glass. The discharge end of the fining chamber is provided with a vertically movable gate 16, and just to the rear of this gate are a pair of floaters 17$^a$ which act as skimming devices. Forward of the gate 16 (Fig. 3) are a pair of driven water cooled rolls 17 and 18 for withdrawing the continuous glass ribbon 19. This ribbon of glass passes over suitable rollers 20 and through the lever 21. The rolls 17 and 18 are illustrated as being driven from an electric motor 22 (Fig. 1) which operates through the reducing gearing 23 and shaft 24. The details of construction of the rolling devices form no part of the present invention, reference being had for a fuller showing of such details to the application of Frederick Gelstharp heretofore referred to, and it will be understood that the invention is not limited to any particular form of ribbon producing means the invention primarily relating to the tank construction described and illustrated, and capable of supplying the necessary quantity of glass properly melted and fined.

The melting tanks 2, 3, and 4 are preferably proportioned in accordance with well accepted principles of construction, the size of the tanks and the relation of the length to the width being preferably made to correspond to the proportions employed where tanks of this kind are used singly. It follows that each tank will deliver glass, which is properly melted, to the fining chamber 1, where the additional heat which is supplied serves to give the necessary fining. The tanks may be all used at the same time or the operation of one or two of them may be discontinued, while still continuing the operation of the system, although the quantity of glass melted in this restricted operation would ordinarily not be sufficient for any long continued period. The gates 12, 13 and 14 may also be used in case the glass from one or more of the tanks becomes poor and it is desired to cut such tank off, and in case the flow of glass from the tanks is not the same, this may be equalized by the partial closing of the proper gates.

Figs. 5 and 6 illustrate a modification in which the fining tank 1$^a$ and the melting tanks employed therewith correspond throughout to what is shown in Fig. 1, except that the ribbon forming means in the Fig. 1 construction is eliminated and a ladling chamber 25 substituted therefor. Such a construction may be used to advantage in connection with the manufacture of window-glass, in which operation the glass is withdrawn from the tank in large ladles, which are transported to drawing pots, where the ladles are emptied and the glass drawn in the form of cylinders. The present construction, involving the use of a plurality of melting tanks (two or more), is useful under these conditions, where the amount of glass required for the forming of the cylinders is very great and it is impractical to enlarge the ordinary form of regenerative furnace to a capacity sufficient to furnish the desired amount of glass. In this construction a gate 26 is employed for cutting off the fining chamber 1$^a$ from the ladling chamber 25.

Fig. 7 illustrates a modification of Fig. 1 in that four melting tanks 27, 28, 29 and 30 are employed instead of the three melting tanks of Fig. 1. These tanks open at their forward end into a fining chamber or tank 31, which corresponds to the chamber 1 of Fig. 1, except as to the number of its sides. In other respects the construction is the same as that in Fig. 1 and the same reference numerals are used to designate similar parts. It is obvious that the number of melting tanks (from two up) and their relation to the fining tank or chamber may be varied to suit requirements, the two forms illustrated, however, in connection with the claims, serve to indicate the scope of the invention.

The means for heating the glass in the fining chamber may be variously arranged and the construction of the chamber considerably modified to suit conditions. Even where burners are used, a part of the heat for fining is received from the melting tanks, and in some cases, the heat from such tanks may be sufficient without the use of auxiliary burners.

Fig. 8 involves a further modification which, in certain respects, is preferred over the constructions heretofore described. The primary distinction in the construction of Fig. 8 is that a settling and mixing chamber is provided intermediate the adjacent ends of the melting tanks and the fining chamber. The glass from the plurality of tanks passes into this settling and mixing chamber while at a relatively high temperature and is there thoroughly mixed and settled before passing into the fining chamber. Under these conditions the danger of the glass not properly combining in the fining chamber is avoided. In some cases, mechanical means may be provided for mixing and stirring the metal in the settling and mixing chamber, in order to promote the mixing action, although this will not ordinarily be necessary, as the glass comes into the mixing chamber at angles which promote the commingling of the glass and this mixing is further promoted by reason of the condition of the glass itself.

Referring to the drawing, 32 is the settling and mixing chamber into which the three tanks, 33, 34 and 35 discharge past the floaters 36 and the gates 37. The fourth side of the chamber 32 opens into the fining chamber 38 and in this chamber, the glass which has been thoroughly mixed and settled in the chamber 32, is permitted to fine to the desired condition, after which it is withdrawn past the roll devices as heretofore fully explained in connection with Figs. 1 to 3. Suitable floaters 39 and 40 are provided at the entrance and exit ends of the fining chamber, and the flow of glass at these points may be controlled by means of gates 41 and 42. Any additional heat required in this chamber is furnished by means of the burners 43.

What I claim is:

1. In combination in a glass tank construction, a settling or mixing chamber, a plurality of melting tanks with their outlet ends leading to such chamber, a fining chamber into which the glass from the settling or mixing chamber is discharged, and means for heating the melting tanks.

2. In combination in a glass tank construction, a settling or mixing chamber, a plurality of melting tanks with their outlet ends leading to such chamber, a fining chamber into which the glass from the settling or mixing chamber is discharged, means for heating the melting tanks, and means for withdrawing the glass from the fining tank.

3. In combination in a glass tank construction, a settling or mixing chamber, a plurality of melting tanks with their outlet ends leading to such chamber, a fining chamber into which the glass from the settling or mixing chamber is discharged, means for heating the melting tanks, and means for withdrawing the glass from the fining tank at a point remote from the point at which it is received.

4. In combination in a glass tank construction, a settling or mixing chamber, a plurality of melting tanks with their outlet ends leading to such chamber, a fining chamber into which the glass from the settling or mixing chamber is discharged, means for heating the melting tanks, and cut-off means between each of the melting tanks and the settling or mixing chamber.

5. In combination in a glass tank construction, a receiving chamber having a plurality of laterally opening sides with a discharge outlet at one of said sides, a plurality of melting tanks leading into the other sides of the tank at angles to each other of less than 180 degrees, means for heating the melting tanks, and means for heating the receiving chamber.

In testimony whereof, I have hereunto subscribed my name this 24th day of March, 1922.

T. H. SWARTZLANDER.